US007515738B1

(12) United States Patent
Moritz

(10) Patent No.: US 7,515,738 B1
(45) Date of Patent: Apr. 7, 2009

(54) BIOMETRIC DATA COLLECTION AND STORAGE SYSTEM

(75) Inventor: Elan Moritz, Lynn Haven, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 783 days.

(21) Appl. No.: 10/914,779

(22) Filed: Aug. 6, 2004

(51) Int. Cl.
*G06K 9/00* (2006.01)

(52) U.S. Cl. ....................... 382/115; 382/190; 713/186; 340/5.52; 379/93.03; 704/246

(58) Field of Classification Search ................. 382/115, 382/118, 116, 125, 124, 190; 713/186, 188, 713/155, 184, 185, 159, 182; 340/5.52, 5.83, 340/5.74, 5.82, 5.6, 5.53; 379/88.02, 189, 379/93.03; 235/380, 382, 379, 382.5, 375, 235/492; 380/30; 902/3; 705/5, 75, 53, 705/67; 704/246, E15.042, E15.044; 711/E12.096
See application file for complete search history.

(56) References Cited

U.S. PATENT DOCUMENTS 5,224,173 A * 6/1993 Kuhns et al. ................ 382/116
5,432,864 A * 7/1995 Lu et al. ..................... 382/118
5,763,837 A * 6/1998 Davignon et al. ....... 174/113 R
5,991,429 A * 11/1999 Coffin et al. ................ 382/118
6,006,328 A * 12/1999 Drake .......................... 726/23
6,609,659 B2 * 8/2003 Sehr ........................... 235/384
6,698,653 B1 * 3/2004 Diamond et al. ............ 235/375
7,090,126 B2 * 8/2006 Kelly et al. ................. 235/384
7,246,740 B2 * 7/2007 Swift et al. ................. 235/379
2003/0117262 A1 * 6/2003 Anderegg et al. .......... 340/5.53
2003/0210139 A1 * 11/2003 Brooks et al. ............... 340/531
2004/0078335 A1 * 4/2004 Calvesio et al. ............... 705/50
2004/0116842 A1 * 6/2004 Mardirossian ................. 604/1
2004/0117638 A1 * 6/2004 Monroe ...................... 713/186
2005/0171787 A1 * 8/2005 Zagami ......................... 705/1

* cited by examiner

*Primary Examiner*—Sheela C Chawan
(74) *Attorney, Agent, or Firm*—James T. Shepherd

(57) ABSTRACT

A biometric data collection and storage system includes stations (e.g., checkpoints such as those found in airports, seaports and border crossings) for collecting biometric data from each individual passing therethrough. The biometric data includes a variety individual-specific biometric features that are measured or collected while the individual is in the station. Each station, uniquely identifiable by a code, assembles a data package to include the biometric data and the station's code. A controller maintained in proximity to the stations receives and encrypts each data package to generate an encrypted data package for each individual. Storage devices/facilities located remotely with respect to the controller are used to store each encrypted data package.

15 Claims, 3 Drawing Sheets

BIOMETRIC DATA COLLECTION AND STORAGE SYSTEM

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to data collection and storage, and more particularly to the collection of biometric data from individuals at one or more locations and the secure storage of such collected data.

BACKGROUND OF THE INVENTION

Attempts to prevent acts of terrorism are a predominant activity for local, national and global security and law enforcement agencies. Currently, national and global security agencies have the best access to information on the whereabouts and movement of suspicious individuals. However, local security and low enforcement agencies are often left out of the information "loop" or are alerted to possible problems well after such problems are first diagnosed. This is unfortunate because local law enforcement agencies are most familiar with the landscape and people in their venue. If local agencies had access to information about whereabouts and movement of suspicious individuals in their area, this information combined with their local knowledge could provide valuable anti-terrorism insight. For efficiency and expediency, information about suspicious individuals ought to be readily available at all times to all levels of cooperating local, national and global security and law enforcement agencies.

SUMMARY OF THE INVENTION

Accordingly, it is an object of the present invention to provide a system that will make information about individuals coming into a locale readily available to security and law enforcement agencies.

Another object of the present invention is to provide a system that can collect and store a variety of biometric data about individuals in a manner that is efficient and secure.

Still another object of the present invention is to provide a system that can unobtrusively collect biometric data and then securely store same in a database that can be accessed by any legitimate or authorized security or low enforcement agency.

Other objects and advantages of the present invention will become more obvious hereinafter in the specification and drawings.

In accordance with the present invention, a biometric data collection and storage system included a plurality of stations (e.g., checkpoints such as those found in airports, seaports and border crossings) for collecting biometric data from each individual passing through one of the stations. The biometric data can include images of the individual, voice recordings of the individual, weight of said individual, and/or other biometric features that are measured or collected while the individual is in the station. Each station, uniquely identifiable by a code, assembles a data package to include the biometric data so-collected for an individual and the station's code. A controller maintained in proximity to the stations receives and encrypts each data package to generate an encrypted data package for each individual. Storage devices/facilities located remotely with respect to the controller are used to store each encrypted data package. A number of the stations and their associated controller can be assigned to a certain locale, and a number of such locales can be linked to the storage devices/facilities on a national or international scale.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
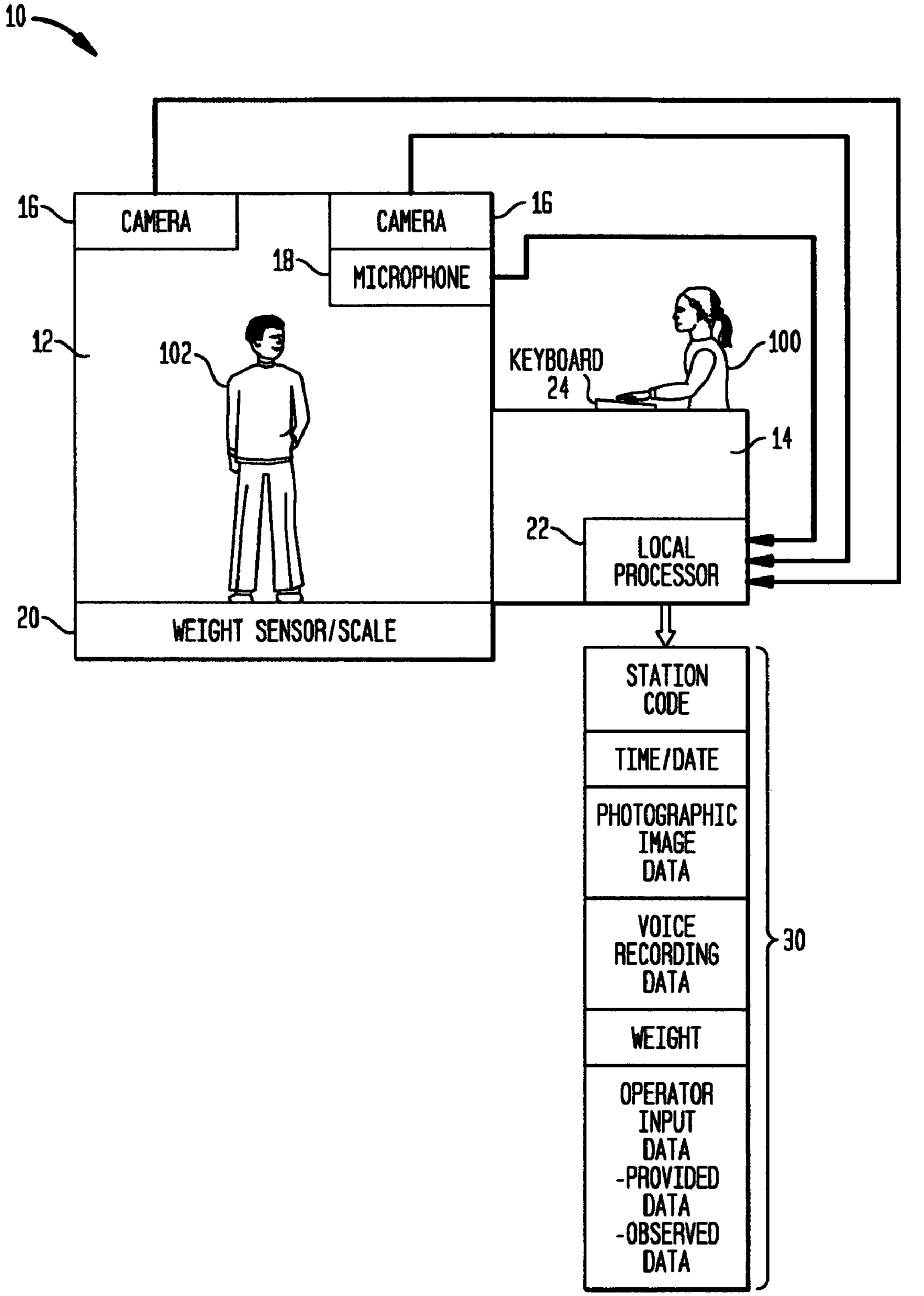
FIG. 1 is a schematic view of an embodiment of a biometric data collection station according to the present invention.

Referring now to the drawings, and more particularly to FIG. 1, a station 10 for collecting and storing biometric data serves as the core element for the various systems of the present invention. Station 10 will typically be positioned at a location or checkpoint used to process individuals prior to their passage through station 10. For example, station 10 could be positioned at one of a country's various points of entry (e.g., airport, seaport, border crossing, etc.) or could be positioned at the entry point of a sensitive site or location. Thus, in general, station 10 is installed at a location where an individual's movement therethrough is controlled.

Station 10 is generally designed with a single passage 12 (e.g., defined by a frame, walls, etc.) through which an individual must pass in order to progress beyond station 10. A variety of biometric data for an individual is collected from the individual while within passage 12. Ideally, some or all of such biometric data is collected unobtrusively or covertly in order to minimize the feeling of intrusion on the general law-abiding public, while maximizing the value of such data collection as suspicious parties will be unaware that data collection is occurring.

Typically, station 10 will include a desk 14 for an operator 100. For example, in terms of a country's point of entry, operator 100 is a trained immigration or customs employee. Accordingly, it is assumed that an individual 102 will have to stop at desk 14 while in passage 12. During this stop, a variety of biometric data is collected. In terms of station 10, such biometric data includes images of individual 102 generated by one or more imagers 16 positioned on station 10, voice recordings of individual 102 captured by one or more microphones 18 positioned on station 10, and weight of individual 102 as measured by a weight sensor/scale 20 that can be incorporated into the floor of station 10 in front of desk 14. Imagers 16 can be realized by any imaging device or "camera" capable of generating a recordable image of individual 102. Such devices include any camera that can generate an image in one or more spectrums such as the visible, infrared, ultraviolet or millimeter wave spectrums.

The images and weight of individual 102 can be collected without any intervention by operator 100. Voice recordings of individual 102 can be recorded after operator 100 asks individual 102 standard questions (e.g., "Where are you from?", "Where are you going?", "How long will you be staying?", "How was the weather where you came from?", etc.) designed to elicit responses covering a range of speech phonemes, lexemes and other fragments useful in voice print modeling. The standard nature of these questions will tend to keep individual 102 in a relaxed and natural tone of voice.

The collected biometric data (e.g., images, voice recordings and weight) are provided to a local processor 22 that assembles and outputs a data package 30. A single data package 30 assembled for each individual 102 includes the following:

(i) a station code (e.g., numeric code, alphanumeric code, etc.) that uniquely identifies station 10 and, possible, its location, (ii) a time/date stamp of when individual 102 is in station 10, (iii) biometric data such as the images, voice recordings and weight of individual 102, and (iv) data input (via keyboard 24) by operator 100.

Operator input data could include data provided by individual 102 (e.g., name, passport information, local address, driver's license data, etc.) as well as observations of operator 100 regarding individual 102. For example, operator 100 could note if individual 102 was nervous or anxious or if individual 102 reacted oddly to a particular question. The completed data package 30 will be forwarded on to a controller for additional processing as will be explained later herein.

Figure 2:
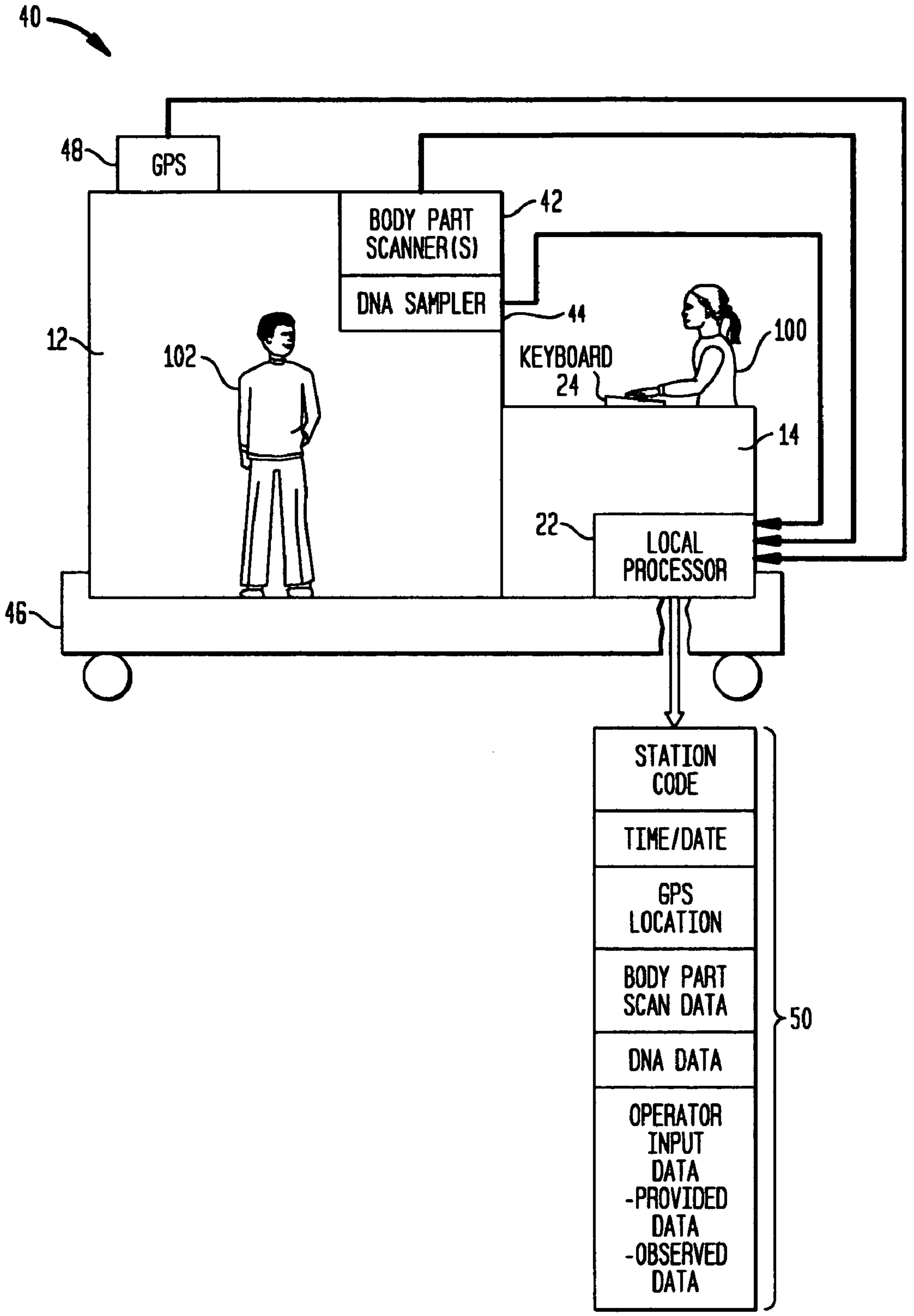
FIG. 2 is a schematic view of another embodiment of a biometric data collection station according to the present invention.

The present invention is not limited to the covert biometric data collection features described above for station 10. For example, station 40 illustrated in FIG. 2 has one or more scanners 42 for reading/recording features associated with a body part of individual 102. For example, scanners 42 could be embodies by one or more of fingerprint scanners, palm scanners and retinal scanners. Use of such scanning techniques typically requires that individual 102 place his/her finger, hand or eye on or near scanner 42. In addition, station 40 could include a DNA sampler 44 to receive/collect a sample from individual 102 that provides a DNA signature therefor. The present invention further contemplates the use of other types of biometric sensing devices that may be developed in the future.

Station 40 could be realized by a fixed structure or could be portable in nature. For example, station 40 could be supported on a movable platform 46 (e.g., manually movable, movable under motor power, etc.) thereby allowing it to be transported to any needed location. It is to be understood that the particular structure that provides portability is not a limitation of the present invention. If portable, station 40 can further be equipped with a Global Positioning System (GPS) 48 that determines a GPS location of station 40 and provides same to onboard local processor 22 that generates a data package 50. As in the previous embodiment, data package 50 includes a station code and a time/date stamp. Additionally, data package 50 includes the GPS location determined by GPS 48. The biometric data will include one or more body part scans and, if available, DNA signature data. Finally, data package 50 will also include operator input data as described above.

The present invention could also be practiced by combining aspects of stations 10 and 40. For example, station 10 could be mounted on a movable platform, could include GPS, and/or could include body part scanners, DNA collectors, etc. While providing a station having all of the features of stations 10 and 40 provides the most complete biometric data "picture" of individual 102, this comes with the highest price tag in terms of cost and obtrusiveness.

Figure 3:
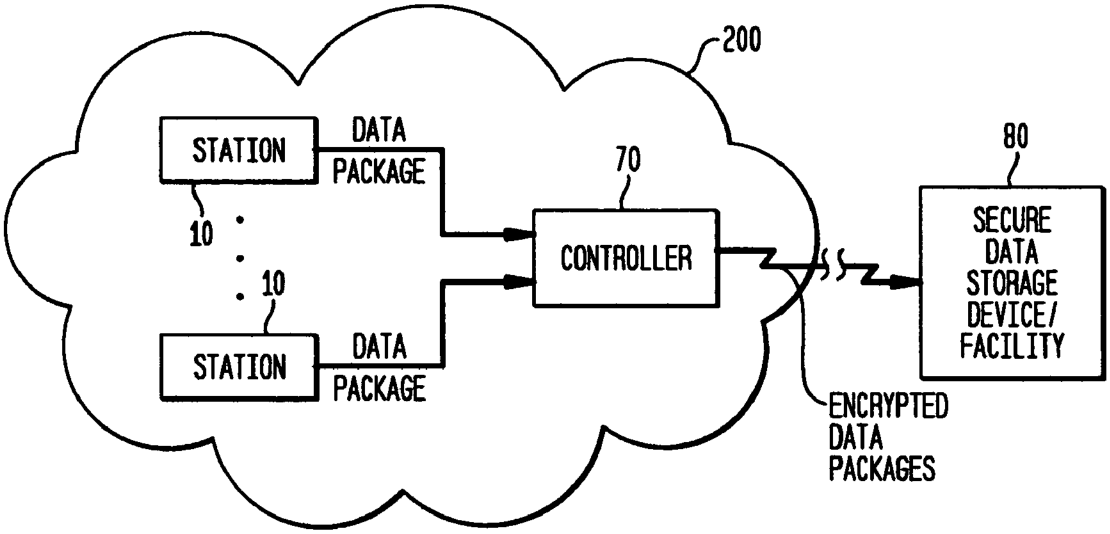
FIG. 3 is a block diagram of a local system for collecting and storing biometric data in accordance with the present invention.

Regardless of the ultimate design of the biometric data collection station, a plurality of such stations will typically be employed at a particular locale (e.g., airport, seaport, border crossing, etc.). As shown in FIG. 3, a locale is referenced by boundary line 200 and each station's (e.g., station 10 is used by way of example) data package is transmitted (e.g., via hardwire or wireless connection) to a local controller 70 installed at locale 200. The primary function of local controller 70 is to receive each data package and then encrypt same for secure storage at a facility that is remote with respect to locale 200. Such encryption can be carried out in a variety of ways. By way of example, one such data encryption method is described in U.S. patent application Ser. No. 10/834,157, filed Apr. 23, 2004, the contents of which are hereby incorporated by reference. The resulting encrypted data packages are transmitted (e.g., via dedicated lines, the internet, wireless transmission, etc.) to one or more of a secure data storage device/facility 80. For example, secure data storage device/facility 80 could be realized by a data storage system that uses geographically-distributed storage devices/facilities as described in U.S. patent application Ser. No. 10/847,682, filed May 17, 2004 (NC 96210).

Figure 4:
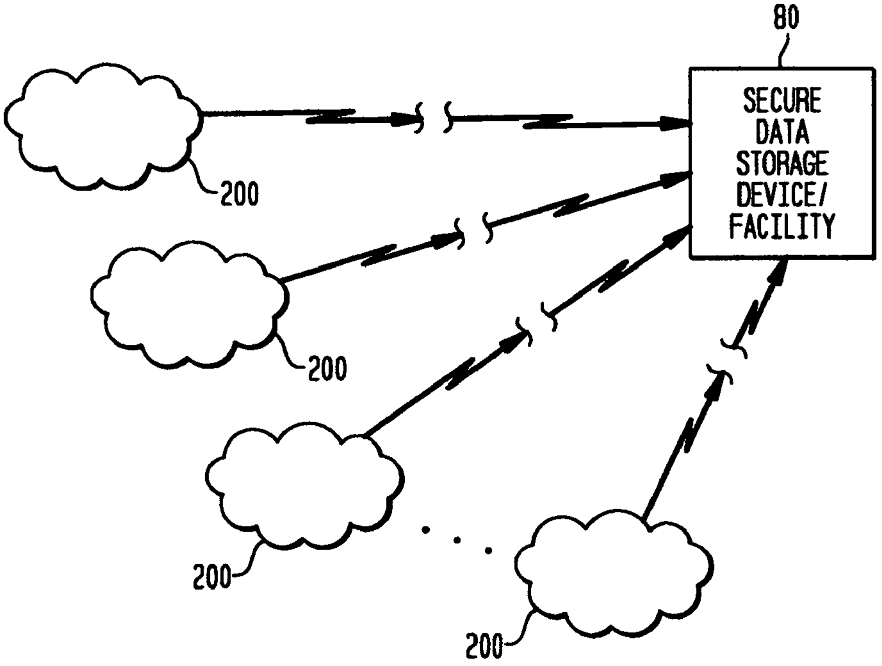
FIG. 4 is a block diagram of a national or international system for collecting and storing biometric data in accordance with the present invention.

The concepts of the present invention can be extended to provide a national or international biometric data collection and storage system. More specifically, FIG. 4 illustrates a number of distinct locales 200 (each of which includes a plurality of stations and a local controller as shown in FIG. 3) transmitting encrypted data packages to secure data storage device/facility 80 which serves as the central repository for all of locales 200. In this way, biometric data for a single locale, selected locales, or an entire nation, can be reviewed/analyzed by local, national and/or international security and law enforcement agencies in an effort to prevent terrorist activity.

The advantages of the present invention are numerous. Biometric data can be collected in a variety of ways at local stations and then stored at a central repository for access by local, national and/or international security and law enforcement agencies. This will allow all levels of security forces to have access to the same information. National and international security and law enforcement agencies can analyze data from a large number of locales to look for trends, while local agencies can track what is happening in "their own backyard".

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A biometric data collection and storage system, comprising:

a plurality of stations for collecting biometric data from each individual passing through one of said plurality of stations, each of said plurality of stations being uniquely identifiable by a code, each of said plurality of stations assembling a data package to include said biometric data so-collected for an individual and said code;

a controller in proximity to said plurality of stations for receiving and encrypting each said data package to generate an encrypted data package for each said individual; and storage means located remotely with respect to said controller for storing each said encrypted data package;

wherein each of said plurality of stations includes a plurality of biometric sensing devices to include (i) imaging means for generating images of said individual, (ii) voice recordation means for generating voice recordings of said individual, and (iii) weighing means for generating a weight of said individual, wherein each said data package comprises said images, said voice recordings and said weight.

2. A biometric data collection and storage system as in claim 1 wherein each of said plurality of stations further includes data entry means adapted to provide an operator the ability to enter additional information about said individual wherein said additional information is included in said data package.

3. A biometric data collection and storage system as in claim 1 further comprising a mobile platform for supporting each of said plurality of stations.

4. A biometric data collection and storage system as in claim 3 wherein each of said plurality of stations further includes a GPS system coupled thereto for generating a location thereof, wherein said location is included in said data package.

5. A biometric data collection and storage system as in claim 1 wherein each of said plurality of stations further includes at least one scanner for reading and recording features associated with a body part of said individual and wherein said features are included in said data package.

6. A biometric data collection and storage system; comprising a plurality of data collectors, each of said plurality of data collectors operating at a location where individual movement therethrough is controlled, each of said plurality of data collectors having (i) a plurality of stations for collecting biometric data from each individual passing through one of said plurality of stations, each of said plurality of stations being uniquely identifiable by a code and assembling a data package to include said biometric data so-collected for an individual and said code, and (ii) a controller at said location and coupled to said plurality of stations for receiving and encrypting each said data package to generate an encrypted data package for each said individual; and storage means located remotely with respect to said location for storing each said encrypted data package generated by said controller at each of said plurality of data collectors;

wherein each of said plurality of stations includes a plurality of biometric sensing devices to include (i) imaging means for generating photographic images of said individual, (ii) voice recordation means for generating voice recordings of said individual, and (iii) weighing means for generating a weight of said individual, wherein each said data package comprises said images, said voice recordings and said weight.

7. A biometric data collection and storage system as in claim 6 wherein each of said plurality of stations further includes data entry means adapted to provide an operator the ability to enter additional information about said individual wherein said additional information is included in said data package.

8. A biometric data collection and storage system as in claim 6 further comprising a mobile platform for supporting each of said plurality of stations.

9. A biometric data collection and storage system as in claim 8 wherein each of said plurality of stations further includes a GPS system coupled thereto for generating a GPS location thereof, wherein said GPS location is included in said data package.

10. A biometric data collection and storage system as in claim 6 wherein each of said plurality of stations recording features associated with a body part of said individual and wherein said features are included in said data package.

11. A biometric data collection and storage system, comprising:

at least one station designed as a checkpoint such that an individual stops within the confines of said station before passing therethrough, each said station being uniquely identifiable by a code, each said station having a plurality of biometric sensing devices to include (i) imaging means for generating images of said individual so-stopped, (ii) voice recordation means for generating voice recordings of said individual so-stopped, and (iii) weighing means for generating a weight of said individual so-stopped, each said station assembling a data package to include said images, said voice recordings, said weight and said code;

a controller coupled to said station for receiving and encrypting each said data package to generate an encrypted data package for each said individual; and storage means located remotely with respect to said controller for storing each said encrypted data package.

12. A biometric data collection and storage system as in claim 11 wherein each said station further includes data entry means adapted to provide an operator the ability to enter additional information about said individual wherein said additional information is included in said data package.

13. A biometric data collection and storage system as in claim 11 further comprising a mobile platform for supporting said station and said controller.

14. A biometric data collection and storage system as in claim 13 wherein each said station further includes a GPS system coupled thereto for generating a GPS location thereof, wherein said GPS location is included in said data package.

15. A biometric data collection and storage system as in claim 11 wherein each said station includes at least one scanner for reading and recording features associated with a body part of said individual and wherein said features are included in said data package.

* * * * *